(12) United States Patent
Hecht

(10) Patent No.: US 7,094,006 B2
(45) Date of Patent: Aug. 22, 2006

(54) CUTTING TOOL

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 175 days.

(21) Appl. No.: 10/375,082

(22) Filed: Feb. 28, 2003

(65) Prior Publication Data

US 2003/0165362 A1 Sep. 4, 2003

(30) Foreign Application Priority Data

Mar. 4, 2002 (IL) .................................... 148475

(51) Int. Cl.
*B23P 15/28* (2006.01)

(52) U.S. Cl. .................. 407/102; 407/103; 407/106; 407/107

(58) Field of Classification Search ............... 407/102, 407/103, 107, 106, 108
See application file for complete search history.

(56) References Cited

U.S. PATENT DOCUMENTS 4,137,000 A * 1/1979 Takacs et al. ............... 407/101
5,779,400 A    7/1998 Fountaine ................... 407/103
6,158,928 A * 12/2000 Hecht ......................... 407/102
6,599,060 B1 * 7/2003 Hecht ......................... 407/102
6,709,204 B1 * 3/2004 Hellstrom et al. ........... 407/102

FOREIGN PATENT DOCUMENTS

CH          686 935 A5    8/1996
DE          311460 A1     2/1982

* cited by examiner

*Primary Examiner*—Willmon Fridie, Jr.
(74) *Attorney, Agent, or Firm*—Womble Carlyle

(57) ABSTRACT

A cutting tool has a tool body in which a cutting insert is secured to an insert pocket in the tool body by a fastener. In contrast to the use of a threaded clamping screw, the fastener remains in engagement with the tool body during all stages of the attachment and clamping, or unclamping and removal of the cutting insert. The fastener is rotatable between a clamping position and a non-clamping position by means of one of two keys. One key being capable of engaging one of the fastener's ends, and the other key being capable of engaging the other of the fastener's ends. This is particularly convenient for circumstances where the approach to one or the other of the fastener's ends may be obstructed.

20 Claims, 9 Drawing Sheets

CUTTING TOOL

FIELD OF THE INVENTION

This invention relates to a cutting tool of the kind having a replaceable cutting insert.

BACKGROUND OF THE INVENTION

Such cutting tools are well known particularly where the cutting insert is replaceably retained by a clamping screw in an insert pocket of the cutting tool. Often with such cutting tools handling difficulties are encountered when removing or replacing the cutting insert, seeing that this requires loosening, removal and screw insertion of the clamping screw in environments in which approach to the clamping screw is either awkward or impossible. For example, in Swiss-type automatic machines cutting tools have tool shanks that are typically made of rectangular shaped bars having a cross-sectional width of between 7 and 12 mm. The cutting insert is clamped in the insert pocket either by means of a screw or a clamp. Screw clamping is disclosed in U.S. Pat. No. 5,779,400 and DE 3114460 A1. Clamps form part of a clamping mechanism that is rather bulky and are not suitable for shanks of very small cross-section. On the other hand, a problem that is encountered with screw-clamped cutting inserts in cutting tools having elongated shanks is that the screw-head is located on one side of the shank. This means that the operator, in order to loosen, remove or insert the screw has to have an approach to the side of the tool shank in which the screw-head is located, which is not always possible.

SUMMARY OF THE INVENTION

In accordance with the present invention there is provided a cutting tool comprising a tool body and a cutting insert secured by a fastener in an insert pocket of the tool body;

the insert pocket comprising a base wall and first and second sidewalls extending generally uprightly from the base wall and a pocket through bore extending from the base wall to a peripheral wall of the tool body;

the cutting insert comprising at least one cutting portion provided with a cutting edge and a support portion provided with an insert through bore having a cylindrical insert through bore wall and at least two circumferentially spaced apart support wings, protruding radially inwardly from the insert through bore wall, each support wing having a sloping support surface with a given shape, the support wings being separated by support wing gaps;

the fastener having a forward portion, a rear portion and a generally cylindrical intermediate portion therebetween, with a longitudinal axis extending through the rear and forward portions, the forward portion being provided with at least two circumferentially spaced apart clamping wings each clamping wing having a sloping generally rearwardly facing clamping surface having a shape corresponding to the given shape of the support surfaces, the clamping wings being separated by clamping wing gaps, the fastener being rotatable about the longitudinal axis between a clamping position and a non-clamping position, wherein in the clamping position the forward portion of the fastener is located in the insert through bore with each clamping surface overlying a corresponding support surface.

In accordance with the present invention, the clamping surface of each clamping wing is helical in shape lying on a given helix of a male screw thread and the support surface of each support wing is helical in shape lying on a helix of a matching female thread.

Further in accordance with the present invention, in the non-clamping position the forward portion of the fastener is located in the insert through bore with each clamping surface located opposite a given support wing gap and with each support surface located opposite a given clamping wing gap.

In accordance with a first embodiment of the present invention, the fastener is linearly moveable in the pocket through bore from the non-clamping position to a withdrawn position, in which the forward portion of the fastener is located within the pocket through bore and not within the insert through bore, and the cutting insert is removable from the insert pocket.

Preferably in accordance with the first embodiment of the present invention, the pocket through bore is provided with an obstacle preventing the complete withdrawal of the fastener from the pocket through bore.

Further preferably in accordance with the first embodiment of the present invention, the intermediate cylindrical portion is provided with a longitudinally extending recess having forward and rear ends, the recess being bound by a lip at the forward end and opens into a neck at the rear end, the intermediate cylindrical portion having a first diameter, the neck having a second diameter, the second diameter being smaller than the first diameter, and the obstacle is located in the recess, thereby allowing to and fro movement of the fastener in the pocket through bore, complete withdrawal of the fastener from the through bore being prevented by the lip engaging the obstacle.

In accordance with the first embodiment, the obstacle is a pin located in a pin bore, with a portion of the pin protruding into the pocket through bore.

Further in accordance with the first embodiment, in both the clamped and non-clamping position, the portion of the pin protruding into the pocket through bore is located in the neck of the fastener.

Yet further in accordance with the first embodiment, in the withdrawn position, the portion of the pin protruding into the pocket through bore is located in the recess.

In accordance with a second embodiment of the present invention, in the non-clamping position the cutting insert is removable from the insert pocket.

Preferably in accordance with the second embodiment, the fastener is provided with an o-ring partially protruding from an annular groove in the cylindrical portion.

Preferably, the rear portion of the fastener is provided with a forwardly tapering cone shaped head and the pocket through bore is provided with a cone shaped countersink configured to receive the forwardly tapering cone shaped head.

Generally, the head of the fastener is provided with a socket for receiving a key for rotating the fastener to and from the clamping and non-clamping positions.

If desired, the socket is an Allen-head socket for and the key is an Allen-type key.

Further if desired, the cutting tool provided in combination with a key having at least two prongs for inserting in the clamping wing gaps for rotating the fastener to and from the clamping and non-clamping positions.

BRIEF DESCRIPTION OF THE DRAWINGS

For a better understanding the invention will now be described, by way of example only, with reference to the accompanying drawings in which.

DETAILED DESCRIPTION OF THE INVENTION

In the following description, the invention is illustrated for a cutting tool of the type typically used for a Swiss-type automatic lathe. However, the invention is directed to the secure retaining of a cutting insert in an insert pocket of a cutting tool. More precisely, the invention is directed to a coupling arrangement between a fastener and a cutting insert and therefore it will be appreciated that the invention is in no way whatsoever restricted to the cutting tools of the type used for Swiss-type automatic lathes, but is applicable to many types of cutting tools wherein a cutting insert is to be secured to an insert pocket by means of a fastener.

Figure 1:
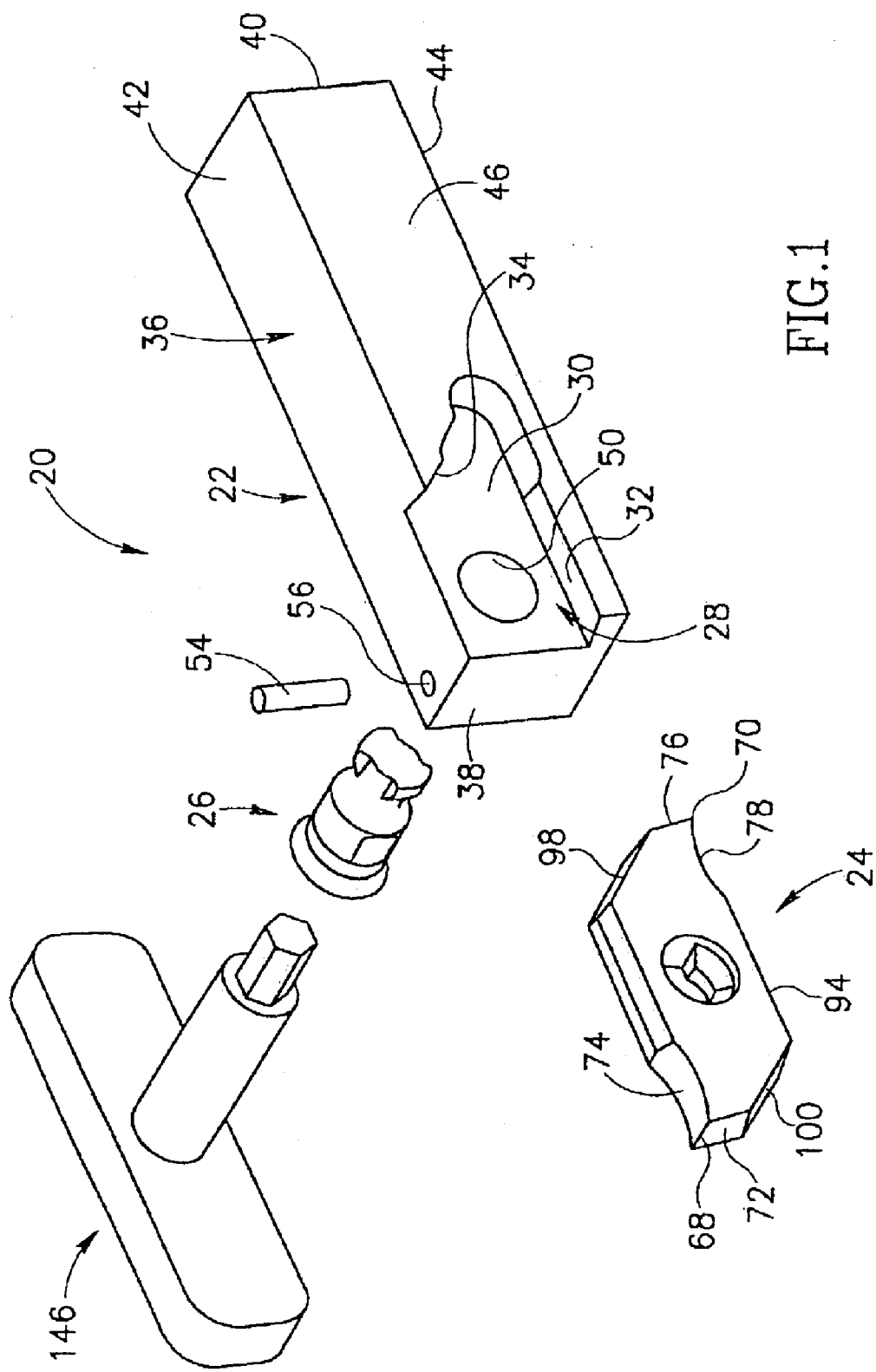
FIG. 1 is an exploded front upper perspective view of a cutting tool with a fastener in accordance with a first embodiment of the present invention, also shown is an Allen-type key.
Figure 2:
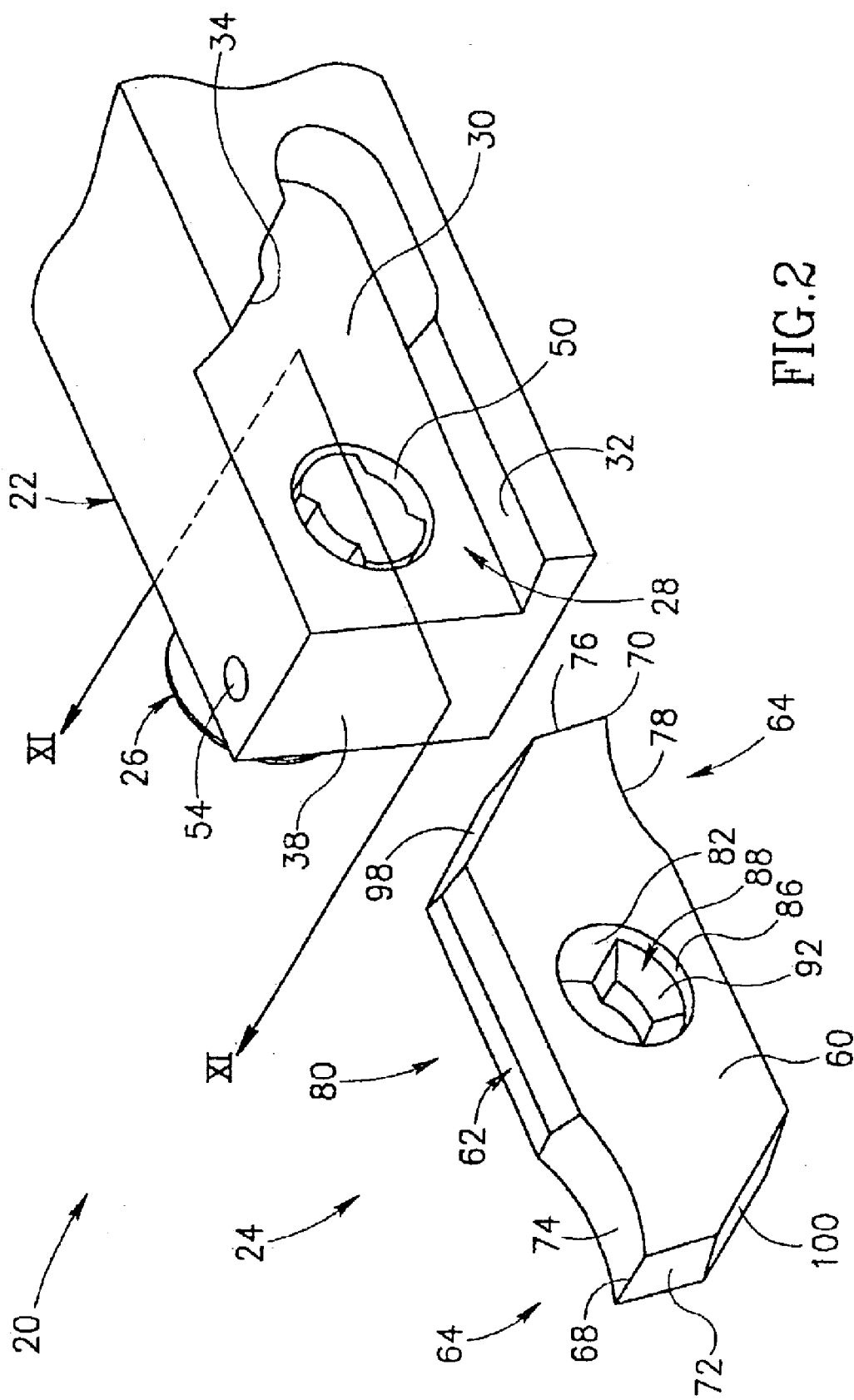
FIG. 2 is a perspective view of the cutting tool in accordance with the first embodiment of the present invention with the cutting insert removed and with the fastener in a withdrawn position.
Figure 3:
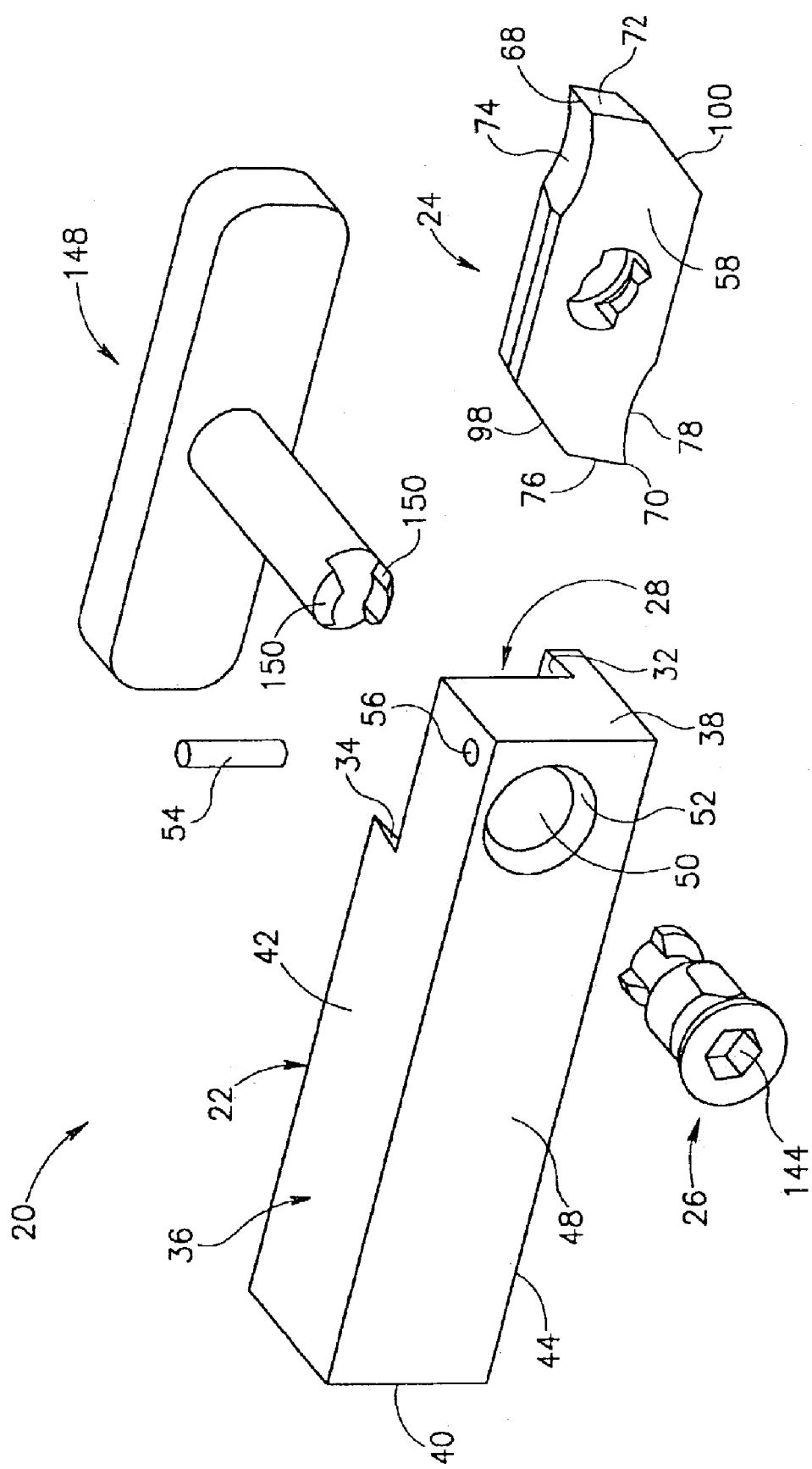
FIG. 3 is an exploded back upper perspective view of the cutting tool with a fastener in accordance with the first embodiment of the present invention, also shown is a two-pronged key.

Attention is first drawn to FIGS. 1 to 3, showing a cutting tool in accordance with a first embodiment of the present invention. The cutting tool 20 comprises a tool body 22 and a cutting insert 24 secured by a fastener 26 in an insert pocket 28 of the tool body 22. The insert pocket 28 comprises a base wall 30 and first and second sidewalls 32, 34 extending generally uprightly from the base wall 30. The tool body 22 has a peripheral wall 36 extending between forward and rear ends 38, 40 of the tool body 22. The peripheral wall 36 comprises four long walls, an upper wall 42, a lower wall 44 and front and back sidewalls 46, 48 extending between the upper and lower walls 42, 44. The insert pocket 28 is located in the front sidewall 46 at the forward end 38 of the tool body 22. A pocket through bore 50 extends from the base wall 30 to the back sidewall 48 of the peripheral wall 36 of the tool body 22. The pocket through bore 50 is provided with a cone shaped countersink 52 opening into the back wall 48. The tool body is provided with a pin 54 located in a pin bore 56. The, pin bore 56 is oriented perpendicularly to the pocket through bore 50 and is positioned such that a portion of the pin 54 protrudes into the pocket through bore 50.

Figure 4:
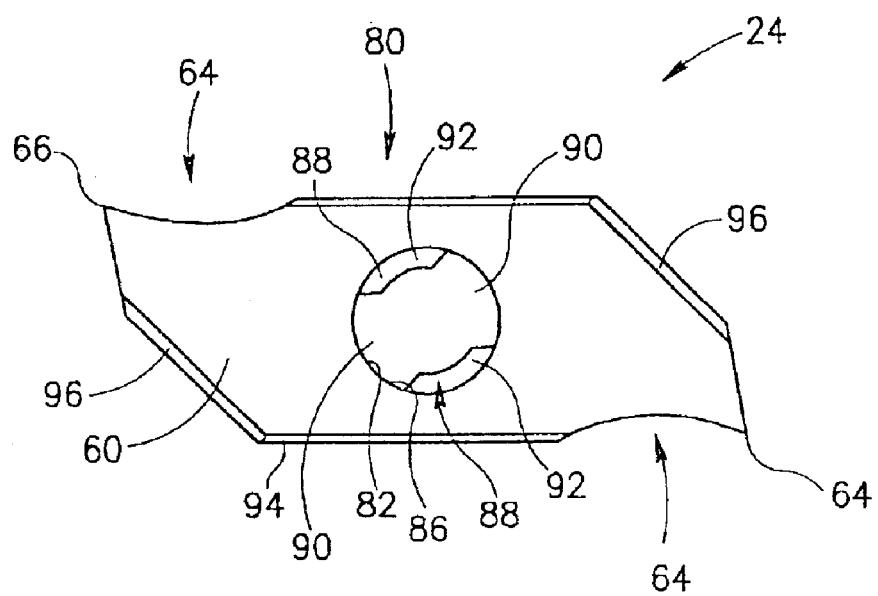
FIG. 4 is a side view of the cutting insert in accordance with the first embodiment of the present invention.

Attention is additionally drawn to FIG. 4. The cutting insert 24 comprises a first substantially flat side surface 58, an opposing second substantially flat side surface 60 generally parallel to the first side surface 58 and a peripheral edge surface 62 extending therebetween. The cutting insert 24 has two cutting portions 64, each cutting portion being provided with a cutting edge 66, one cutting edge being an operative cutting edge 68 and the other one being a non-operative cutting edge 70. The operative cutting edge 68 is formed at the intersection of an operative relief surface 72 with an operative rake surface 74 and the non-operative cutting edge 70 being formed at the intersection of a non-operative relief surface 76 with a non-operative rake surface 78. Extending between the cutting portions 64 is a support portion 80. The support portion is provided with an insert through bore 82 extending between the first and second side surfaces 58, 60. The insert through bore 82 has a cylindrical insert through bore wall 86 and two circumferentially spaced apart support wings 88 protruding radially inwardly from the insert through bore wall 86, the support wings being separated by support wing gaps 90. Each support wing 88 has a sloping support surface 92. The support surfaces 92 are preferably helical in shape lying on a common helix of a female thread. The cutting insert 24 has four abutment surfaces, a first abutment surface 94, on a lower peripheral edge of the support portion 80, two second abutment surfaces 96, on the peripheral edge surface 62, an operative second abutment surfaces 98 adjacent the non-operative relief surface 76 and a non-operative second abutment surfaces 100 adjacent the operative relief surface 72, and the first side surface 58 forms the third abutment surface. When the cutting insert 24 is retained in the insert pocket 28 (see also FIGS. 9, 14 and 15), the first abutment surface 94 abuts the first sidewall 32 of the insert pocket 28, the operative second abutment surfaces 98 abuts the second sidewall 34 of the insert pocket 28 and the first side surface 58 of the cutting insert 24 abuts the base wall 30 of the insert pocket 28.

Figure 5:
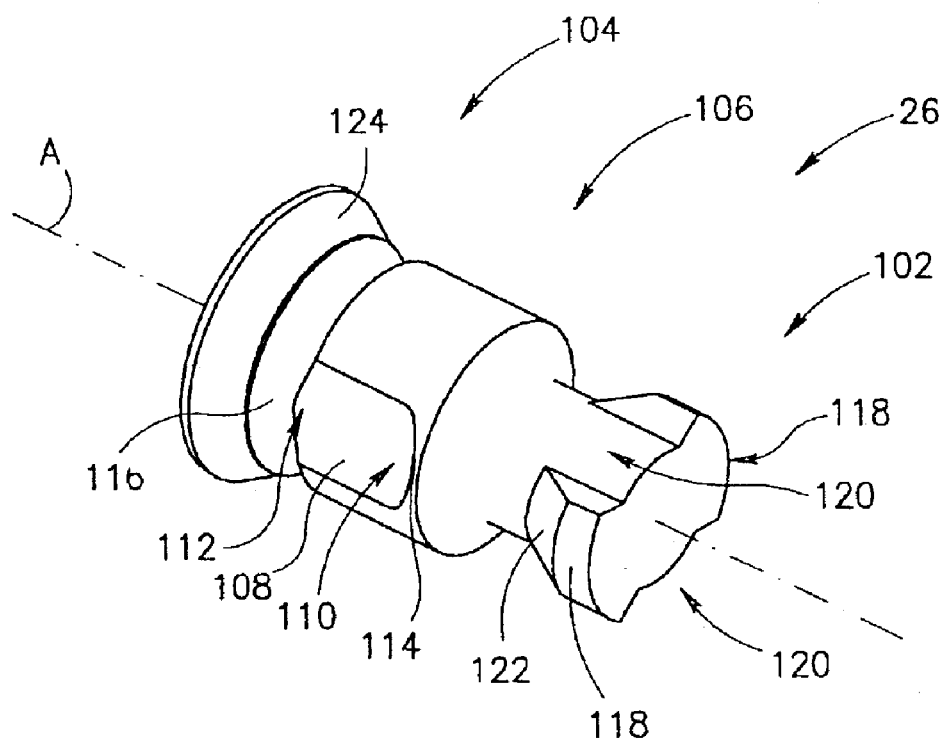
FIG. 5 is a perspective view of the fastener in accordance with the first embodiment of the present invention.
Figure 6:
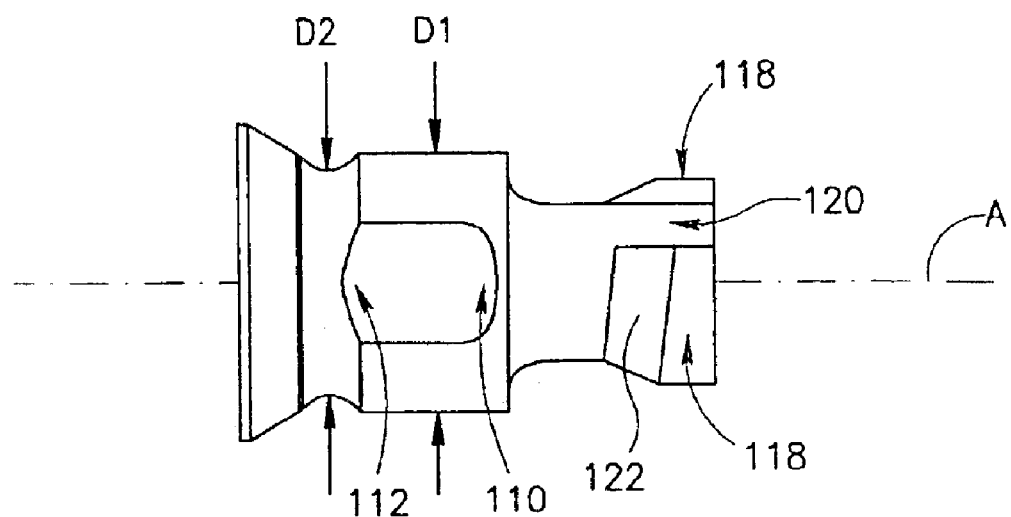
FIG. 6 is a first side view of the fastener in accordance with the first embodiment of the present invention.
Figure 7:
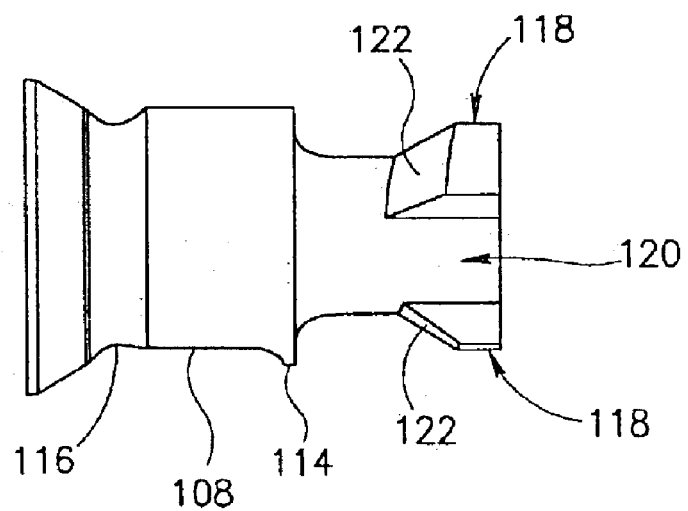
FIG. 7 is a second side view of the fastener in accordance with the first embodiment of the present invention.

The fastener 26, which is shown in greater detail in FIGS. 5 to 7, has a forward portion 102, a rear portion 104 and a generally cylindrical intermediate portion 106 therebetween. A longitudinal axis A extends through the forward and rear portions 102, 104. The forward portion 102 is provided with two circumferentially spaced apart clamping wings 118, the clamping wings 118 being separated by clamping wing gaps 120. Each clamping wing 118 has a sloping generally rearwardly facing clamping surface 122. The clamping surfaces 122 and the support surfaces 92 have matching forms so that they can smoothly engage each other and mutually slide one on the other. The clamping surfaces 122 are preferably helical in shape lying on a common helix of a male screw thread matching the female thread of the support surfaces 92. The rear portion 104 of the fastener 26 is provided with a forwardly tapering cone shaped countersunk head 124 matching the cone shaped countersink 52 in the pocket through bore 50. The intermediate cylindrical portion 106 is provided with a longitudinally extending substantially flat recess 108 having forward and rear ends 110, 112, the recess being bound by a lip 114 at the forward end 110 and opens into a neck 116 at the rear end 112, the intermediate cylindrical portion 106 having a first diameter D1, the neck 116 having a second diameter D2, the second diameter being smaller than the first diameter D1.

Figure 8:
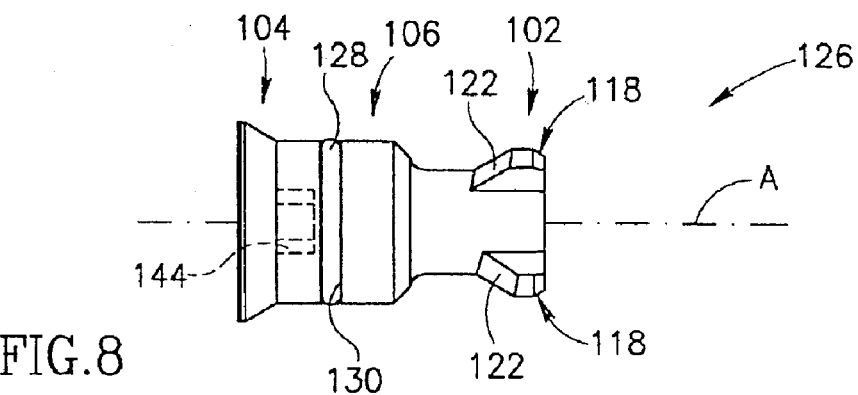
FIG. 8 is a side view of the modified fastener in accordance with the second embodiment of the present invention.

A modified fastener 126 in accordance with the second embodiment of the invention is shown in FIG. 8. The modified fastener 126 is very similar in structure to the fastener 26 of the first embodiment. In fact, the main difference is that unlike the fastener 26 of the first embodiment, the modified fastener 126 does not require a neck 116 or a recess 108 and therefore these features are not present for the modified fastener 126. On the other hand, the modified fastener 126 in accordance with the second embodiment is preferably provided with an o-ring 128 partially protruding from an annular groove 130 in the intermediate cylindrical portion 106. The same reference numerals have been used for those features of the modified fastener 126 that are the same as those of the fastener 26 of the first embodiment.

Figure 9:
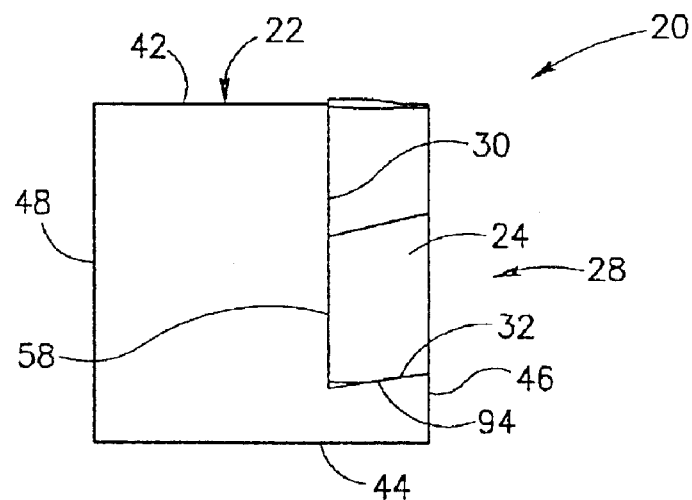
FIG. 9 is a front view of the cutting tool in accordance with the first embodiment of the present invention.
Figure 10:
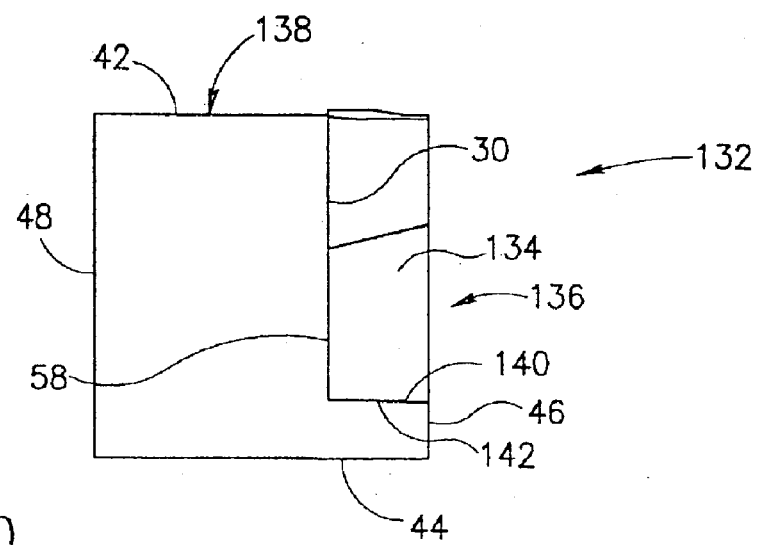
FIG. 10 is a front view of the modified cutting tool in accordance with a second embodiment of the present invention.

Attention is now drawn to FIG. 9, showing a forward end view of a first embodiment of the cutting tool in accordance with the present invention. In accordance with the first embodiment, the first sidewall 32 of the insert pocket 28 slopes downwardly from the front wall 46 towards the lower wall 44. The cutting insert 24 is so designed that the first abutment surface 94 has a matching slope to that of the first sidewall 32. In accordance with the second embodiment of the present invention, as shown in FIG. 10, a modified cutting tool 132 is provided. The modified cutting tool 132 comprises a modified cutting insert 134 clamped in a modified insert pocket 136 in a modified tool body 138 by means of the modified fastener 126. In accordance with the second embodiment of the present invention, as shown in FIG. 10, the modified insert pocket 136 first sidewall 140 is perpendicular to the base wall 30. Correspondingly, the modified cutting insert 134 has a first abutment surface 142 that is perpendicular to its first side surface 58. As will be described below, although the clamping and non-clamping of the cutting insert 24, 134 is a two-step process for both embodiments, the placement of the cutting insert 24 in the insert pocket 28 and withdrawal of the cutting insert 24 from the insert pocket 28, requires an extra step in the first embodiment. Therefore, the process for clamping the cutting insert 24 in the insert pocket 28, in accordance with the first embodiment, is a three-step process.

Figure 11:
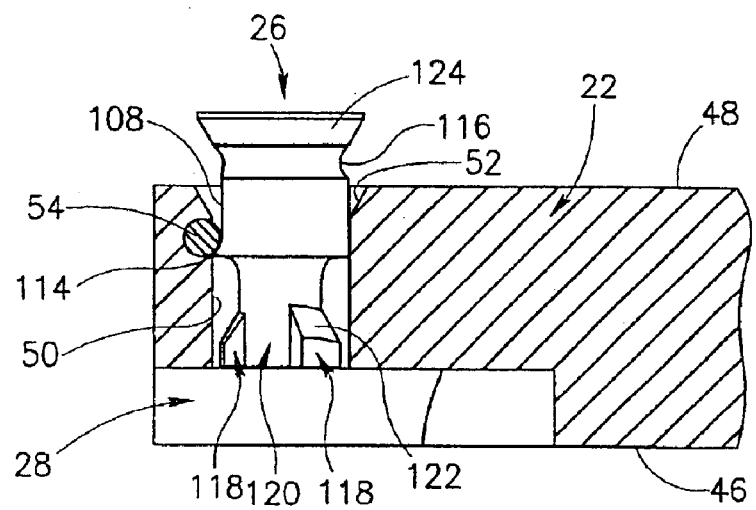
FIG. 11 is a partial cross-sectional view of the cutting tool in FIG. 2 taken along the line XI—XI, showing the fastener in the withdrawn position.

Attention is now drawn to FIGS. 11 to 15, which illustrate the clamping/unclamping of the cutting insert 24 in/from the insert pocket 28, in accordance with a first embodiment of the present invention. FIG. 11 is a partial cross section of the tool body, taken along the line XI—XI in FIG. 2, with the cutting insert removed and with the head 124 of the fastener 26 within the pocket through bore 50. This position of the fastener 26, in which the forward portion 102 of the fastener is located in the pocket through bore 50 will be termed the "withdrawn" position of the fastener 26. It will be noted that the fastener has not been cross-sectioned, so that the orientation of the clamping wings 118 can clearly be seen. In the withdrawn position, no part of the fastener is located in the insert pocket 28 and the cutting insert 24 can be freely placed in, or removed from, the insert pocket 28. This point will be further discussed below. It will be noted that in the withdrawn position the lip 114 and the recess 108 of the fastener 26 abut the pin 54, which protrudes partially into the pocket through bore 50. In fact, the pin 54 constitutes an obstacle preventing the complete withdrawal of the fastener 26 from the pocket through bore 50. With the lip 114 in engagement with the pin 54 withdrawal of the fastener 26 is prevented since the lip 114 cannot pass the portion of the pin 54 that protrudes into the pocket through bore 50. However, the fastener 26 has to be initially assembled in the tool body 22. In order to initially locate the fastener 26 in the pocket through bore 50 the pin 54 has to be removed from the pin bore 56. After the fastener 26 has been positioned in the pocket through bore 50, the pin 54 is placed in the pin bore 56. Clearly, if for any reason it is required to completely withdraw the fastener 26 from the pocket through bore 50 then the pin 54 has to be removed from the pin bore 56.

Figure 12:
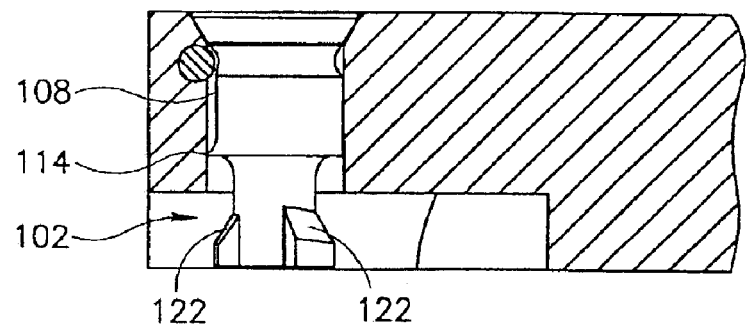
FIG. 12 is a view similar to that shown in FIG. 11 but with the fastener in an non-clamping position.

The fastener 26 is linearly movable within the pocket through bore 50 form the withdrawn position to the position shown in FIG. 12, which will be referred to as the "non-clamping" position. In the non-clamping position, the cone shaped region of the countersunk head 124 abuts the cone shaped countersink 52 and the pin 54 is located in the neck 116 of the fastener 26. Since the pin 54 is no longer in engagement with the flat recess 108, the fastener 26 can now be rotated about its axis A in order to bring it to the position shown in FIG. 13 which will be referred to as the "clamped" position.

Figure 13:
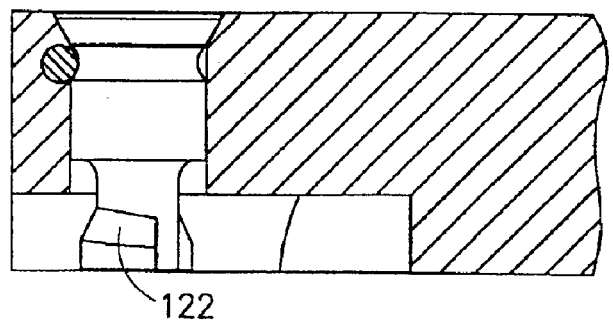
FIG. 13 is a view similar to that shown in FIG. 12 but with the fastener in a clamping position.
Figure 14:
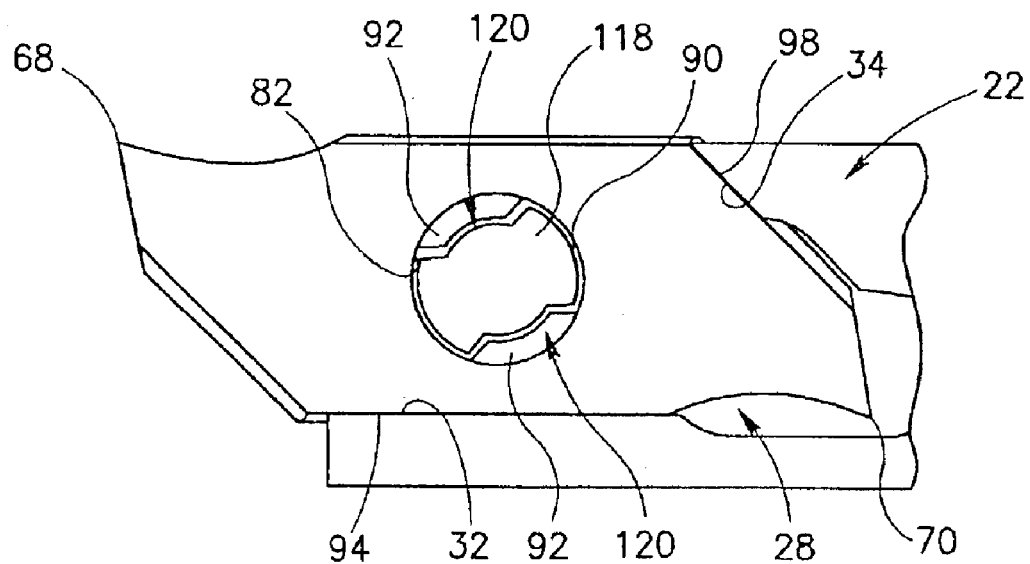
FIG. 14 is a partial side view of the cutting tool in accordance with the first embodiment of the present invention with the fastener in the non-clamping position.
Figure 15:
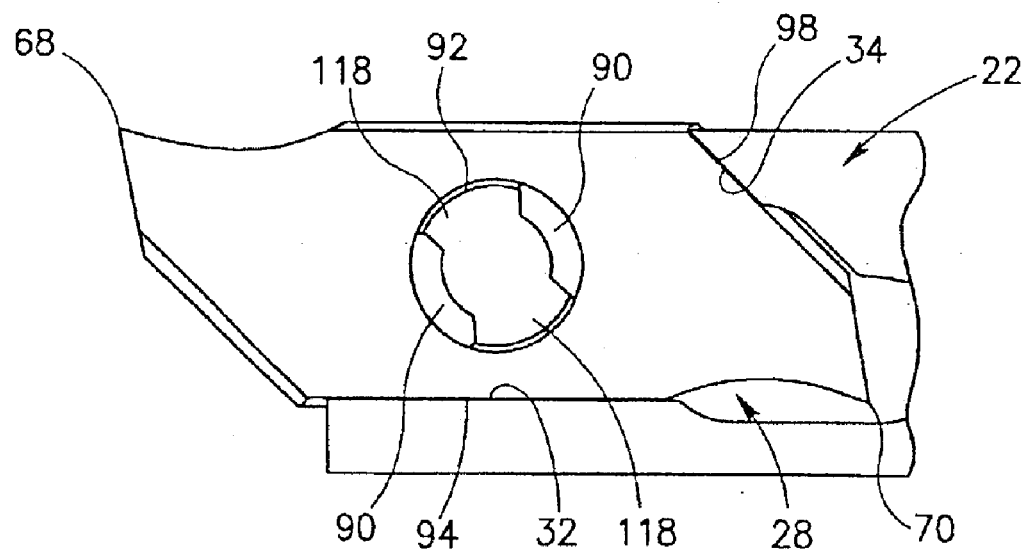
FIG. 15 is a partial side view of the cutting tool in accordance with the first embodiment of the present invention with the fastener in the clamping position.
Figure 16:
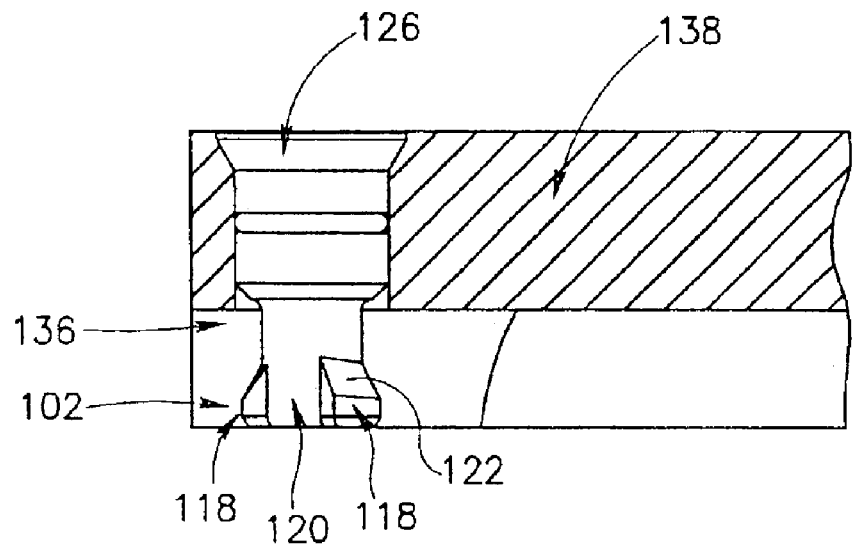
FIG. 16 is a view similar to that shown in FIG. 12 showing the modified fastener in an non-clamping position for a cutting tool in accordance with the second embodiment of the present invention.

The three-step process for clamping the cutting insert 24 in the insert pocket 28, in accordance with the first embodiment, will now be described with reference to FIGS. 11 to 15. In step 1, the fastener 26 is moved to the withdrawn position (FIG. 11) and the cutting insert 24 is placed in the insert pocket 28. In step 2, the fastener 26 is linearly moved into the non-clamping position. In the non-clamping position the forward portion 102 of the fastener 26 is located in the insert through bore 82 with each clamping wing 118 and its associated clamping surface 122 located opposite a support wing gap 90 and with each support surface 92 located opposite a clamping wing gap 120 (FIG. 14, see also FIG. 12 showing the position of the fastener 26 and the orientation of the clamping wings 118 and their associated clamping surfaces 122). Finally, in step 3, the fastener 26 is rotated in a clockwise direction around its axis A to the clamping position in which each clamping surface 122 of the clamping wings 118 of the fastener 26 overlies a corresponding support surface 92 of the support wings 88 of the pocket through bore 50 (FIGS. 13 and 15).

In order to unclamp and remove the cutting insert 24 from the insert pocket 28, the above three steps are carried out in reverse order. That is, first the fastener 26 is rotated in an anticlockwise direction around it axis A, then the fastener 26 is linearly moved until the forward portion 102 of the fastener 26 exits the insert through bore 82 and is located within the pocket through bore 50. Finally, the cutting insert 24 is removed from the insert pocket 28.

It will be appreciated that in accordance with the first embodiment the fastener 26 has to be in the withdrawn position in order to either place the cutting insert 24 in the insert pocket 28, or to remove it therefrom. This is due to the sloped first sidewall 32 of the insert pocket 28 and the correspondingly sloped first abutment surface 94 of the cutting insert 24.

Figure 17:
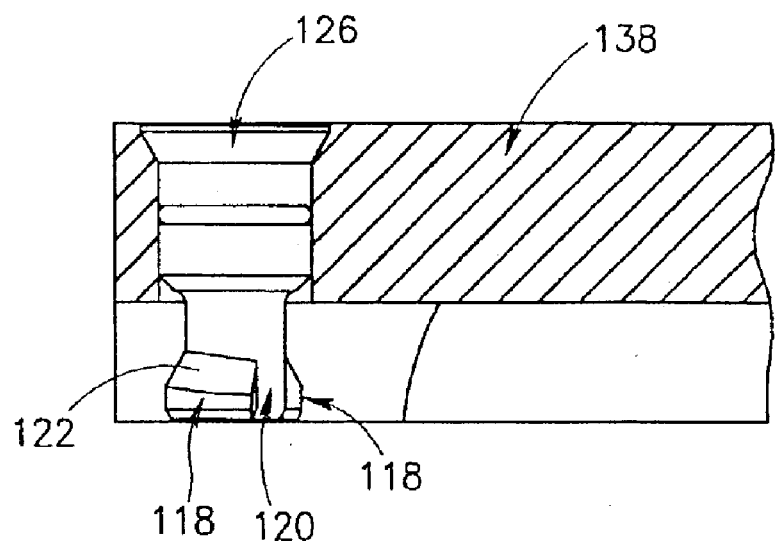
FIG. 17 is a view similar to that shown in FIG. 16 but with the modified fastener in a clamping position.

The clamping of the modified cutting insert 134, in accordance with the second embodiment, will now be described with reference to FIGS. 14 to 17. In accordance with this embodiment, the forward portion 102 of the modified fastener 126 is always located in the modified insert pocket 136 and no linear movement of the modified cutting insert 134 is required. In step 1 the modified fastener 126 into the non-clamping position (FIG. 16), unless it is already in this position, and the modified cutting insert 134 is slid into the modified insert pocket 136, with the first side surface 58 of the modified cutting insert 134 maintained parallel to the base wall 30 of the modified insert pocket 136. This is possible since in accordance with the second embodiment the first sidewall 140 and the base wall 30 of the modified insert pocket 136 are perpendicular to each other (see FIG. 10). In this position the forward portion 102 of the modified fastener 126 is located in the insert through bore 82 with each clamping wing 118 and its associated clamping surface 122 located opposite a support wing gap 90 and with each support wing 92 located opposite a clamping wing gap 120, exactly in the same manner as is shown in FIG. 14 for the first embodiment. In step 2 the modified fastener 126 is rotated in a clockwise direction around its axis A to the clamping position in which each clamping surface 122 of the clamping wings 118 of the modified fastener 126 overlies a corresponding support surface 92 of the support wings 88 of the pocket through bore 50 (FIGS. 17 and 15). Clearly, in order to unclamp and remove the modified cutting insert 134 from the modified insert pocket 136, the above two steps are carried out in reverse order. That is, first the modified fastener 126 is rotated in an anticlockwise direction around it axis A, and then the modified cutting insert 134 is removed from the modified insert pocket 136 by sliding it out of the modified insert pocket 136, with the first side surface 58 of the modified cutting insert 134 maintained parallel to the base wall 30 of the modified insert pocket 136.

Referring now to FIGS. 1 and 2, it will be noted that the head of the fastener 124 is provided with a socket 144 for receiving a socket-key 146 for rotating the fastener 124 about its axis A to and from the clamping and non-clamping positions. Typically, the socket is an Allen-head socket for and the key an Allen-type key. In the same way, the modified fastener is also provided with a socket 144 for receiving the socket-key 146. A two-pronged key 148 having two prongs 150 is also provided. The two prongs 150 are sized and positioned so that they can be inserted between the clamping wing gaps 90 in order to rotate the fastener to and from the clamping and non-clamping positions.

In other words the socket key 146 engages the fastener 26, or modified fastener 126, at its rear portion 104, whilst the two-prong key engages the fastener 26, or modified fastener 126, at its forward portion 102. The provision of two keys, one which turns the fastener 26, or modified fastener 126, from one end and the other which turns the fastener 26, or modified fastener 126, from the other end, is particularly convenient for circumstances where sometimes the approach to one or the other of the fastener's ends may be obstructed. It will be noted that unlike cutting tools that requires the use of a clamping screw, which has to be completely removed in order to index or replace a cutting insert, in accordance with the present invention the fastener 26 (or modified fastener 126) remains in engagement with the tool body 22 (or modified tool body 138) during all stages of the attachment and clamping, or unclamping and removal of the cutting insert 24 (or modified cutting insert 134).

Although the present invention has been described to a certain degree of particularity, it should be understood that various alterations and modifications can be made without departing from the spirit or scope of the invention as hereinafter claimed. For example, the present invention has been illustrated with respect to a cutting insert having two cutting edges. However, it will be clear to those skilled in the art that the invention can easily be applied to a cutting insert having more than two cutting edges. It will also be clear that the number of support wings 88 and the corresponding number of clamping wings 118 is preferably equal to the number of cutting edges.

What is claimed is:

1. A cutting tool comprising a tool body and a cutting insert secured by a fastener in an insert pocket of the tool body;

the insert pocket comprising a base wall and first and second sidewalls extending generally uprightly from the base wall and a pocket through bore extending from the base wall to a peripheral wall of the tool body;

the cutting insert comprising at least one cutting portion provided with a cutting edge and a support portion provided with an insert through bore having a cylindrical insert through bore wall and at least two circumferentially spaced apart support wings protruding radially inwardly from the insert through bore wall, each support wing having a sloping support surface with a given shape, the support wings being separated by support wing gaps;

the fastener having a forward portion, a rear portion and a generally cylindrical intermediate portion therebetween, with a longitudinal axis extending through the rear and forward portions, the forward portion being provided with at least two circumferentially spaced apart clamping wings each clamping wing having a sloping generally rearwardly facing clamping surface having a shape corresponding to the given shape of the support surfaces, the clamping wings being separated by clamping wing gaps, the fastener being rotatable about the longitudinal axis between a clamping position and a non-clamping position, wherein in the clamping position the forward portion of the fastener is located in the insert through bore with each clamping surface overlying a corresponding support surface;

wherein the clamping surface of each clamping wing is helical in shape lying on a given helix of a male screw thread and the support surface of each support wing is helical in shape lying on a helix of a matching female thread.

2. The cutting tool according to claim 1, wherein in the non-clamping position the forward portion of the fastener is located in the insert through bore with each clamping surface located opposite a given support wing gap and with each support surface located opposite a given clamping wing gap.

3. A cutting tool comprising a tool body and a cutting insert secured by a fastener in an insert pocket of the tool body;

the insert pocket comprising a base wall and first and second sidewalls extending generally uprightly from the base wall and a pocket through bore extending from the base wall to a peripheral wall of the tool body;

the cutting insert comprising at least one cutting portion provided with a cutting edge and a support portion provided with an insert through bore having a cylindrical insert through bore wall and at least two circumferentially spaced apart support wings protruding radially inwardly from the insert through bore wall, each support wing having a sloping support surface with a given shape, the support wings being separated by support wing gaps;

the fastener having a forward portion, a rear portion and a generally cylindrical intermediate portion therebetween, with a longitudinal axis extending through the rear and forward portions, the forward portion being provided with at least two circumferentially spaced apart clamping wings each clamping wing having a sloping generally rearwardly facing clamping surface having a shape corresponding to the given shape of the support surfaces, the clamping wings being separated by clamping wing gaps, the fastener being rotatable about the longitudinal axis between a clamping position and a non-clamping position, wherein in the clamping position the forward portion of the fastener is located in the insert through bore with each clamping surface overlying a corresponding support surface;

wherein the fastener is linearly in the pocket through bore in a solely linear direction from the non-clamping position to a withdrawn position, in which the forward portion of the fastener is located within the pocket through bore and not within the insert through bore, and the cutting insert is removable from the insert pocket.

4. The cutting tool according to claim 3, wherein the pocket through bore is provided with an obstacle preventing the complete withdrawal of the fastener from the pocket through bore.

5. The cutting tool according to claim 4, wherein the intermediate cylindrical portion is provided with a longitudinally extending recess having forward and rear ends, the recess being bound by a lip at the forward end and opens into a neck at the rear end, the intermediate cylindrical portion having a first diameter, the neck having a second diameter, the second diameter being smaller than the first diameter, and the obstacle is located in the recess, thereby allowing to and fro movement of the fastener in the pocket through bore, complete withdrawal of the fastener from the through bore being prevented by the lip engaging the obstacle.

6. The cutting tool according to claim 5, wherein the obstacle is a pin located in a pin bore, with a portion of the pin protruding into the pocket through bore.

7. The cutting tool according to claim 6, wherein in both the clamped and non-clamping position, the portion of the pin protruding into the pocket through bore is located in the neck of the fastener.

8. The cutting tool according to claim 6, wherein in the withdrawn position, the portion of the pin protruding into the pocket through bore is located in the recess.

9. The cutting tool according to claim 1, wherein in the non-clamping position the cutting insert is removable from the insert pocket.

10. The cutting tool according to claim 1, wherein the fastener is provided with an O-ring partially protruding from an annular groove in the cylindrical portion.

11. The cutting tool according to claim 1, wherein:
the rear portion of the fastener is provided with a forwardly tapering cone shaped head; and
the pocket through bore is provided with a cone shaped countersink configured to receive said forwardly tapering cone shaped head.

12. A cutting tool comprising a tool body and a cutting insert secured by a fastener in an insert pocket of the tool body;
the insert pocket comprising a base wall and first and second sidewalls extending generally uprightly from the base wall and s pocket through bore extending from the base wall to a peripheral wall of the tool body;
the cutting insert comprising at least one cutting portion provided with a cutting edge and a support position provided with an insert through bore having a cylindrical insert through bore wall and at least two circumferentially spaced apart support wings protruding radially inwardly from the insert through bore wall, each support wing having a sloping support surface with a given shape, the support wings being separated by support wing gaps;
the fastener having a forward portion, a rear portion and a generally cylindrical intermediate portion therebetween, with a longitudinal axis extending through the rear and forward portions, the forward portion being provided with at least two circumferentially spaced apart clamping wings each clamming wing having a sloping generally rearwardly facing clamping surface having a shape corresponding to the given shape of the support surfaces, the clamping wings being separated by clamping wing gaps, the fastener being rotatable about the longitudinal axis between a clamping position and a non-clamping position, wherein in the clamping position the forward portion of the fastener is located in the insert through bore with each clamping surface overlying a corresponding support surface;
wherein the head of the fastener is provided with a socket for receiving a key for rotating the fastener to and from the clamping and non-clamping positions.

13. The cutting tool according to claim 12, wherein the socket is an Allen-head socket and the key is an Allen-type key.

14. The cutting tool according to claim 1, in combination with a key having at least two prongs for inserting in the clamping wing gaps for rotating the fastener to and from the clamping and non-clamping positions.

15. The cutting tool according to claim 1, wherein the fastener is linearly moveable in the pocket through bore from the non-clamping position to a withdrawn position, in which the forward portion of the fastener is located within the pocket through bore and not within the insert through bore, and the cutting insert is removable from the insert pocket.

16. The cutting tool according to claim 15, wherein the pocket through bore is provided with an obstacle preventing the complete withdrawal of the fastener from the pocket through bore.

17. The cutting tool according to claim 16, wherein the intermediate cylindrical portion is provided with a longitudinally extending recess having forward and rear ends, the recess being bound by a lip at the forward end and opens into a neck at the rear end, the intermediate cylindrical portion having a first diameter, the neck having a second diameter, the second diameter being smaller than the first diameter, and the obstacle is located in the recess, thereby allowing to and fro movement of the fastener in the pocket through bore, complete withdrawal of the fastener from the through bore being prevented by the lip engaging the obstacle.

18. The cutting tool according to claim 17, wherein the obstacle is a pin located in a pin bore, with a portion of the pin protruding into the pocket through bore.

19. The cutting tool according to claim 18, wherein in both the clamped and non-clamping position, the portion of the pin protruding into the pocket through bore is located in the neck of the fastener.

20. The cutting tool according to claim 18, wherein in the withdrawn position, the portion of the pin protruding into the pocket through bore is located in the recess.

* * * * *